(12) United States Patent
Mitsuno et al.

(10) Patent No.: US 6,712,921 B2
(45) Date of Patent: Mar. 30, 2004

(54) PROCESS FOR MAKING ELASTICALLY STRETCHABLE COMPOSITE SHEET

(75) Inventors: Satoshi Mitsuno, Kagawa-ken (JP); Hideyuki Ishikawa, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 37 days.

(21) Appl. No.: 09/821,581

(22) Filed: Mar. 29, 2001

(65) Prior Publication Data

US 2001/0025686 A1 Oct. 4, 2001

(30) Foreign Application Priority Data

Mar. 31, 2000 (JP) ......................... 2000-099887

(51) Int. Cl.$^7$ .................. B32B 31/00; A61F 13/15
(52) U.S. Cl. .................. 156/164; 156/163; 156/229; 156/290; 156/291
(58) Field of Search .................. 156/163, 164, 156/229, 290, 291

(56) References Cited

U.S. PATENT DOCUMENTS

| | | | | |
|---|---|---|---|---|
| 3,047,444 A | * | 7/1962 | Harwood | 156/291 |
| 3,788,936 A | * | 1/1974 | Brock et al. | 156/291 |
| 4,265,954 A | * | 5/1981 | Romanek | 156/290 |
| 4,525,407 A | * | 6/1985 | Ness | 428/138 |
| 4,588,630 A | * | 5/1986 | Shimalla | 156/290 |
| 4,606,964 A | * | 8/1986 | Wideman | 428/152 |
| 4,999,235 A | * | 3/1991 | Lunn et al. | 428/156 |
| 5,543,206 A | * | 8/1996 | Austin et al. | 2/111 |
| 5,628,741 A | | 5/1997 | Buell et al. | |
| 5,695,868 A | | 12/1997 | McCormack | |

FOREIGN PATENT DOCUMENTS

| | | |
|---|---|---|
| EP | 0 832 629 A2 | 4/1998 |
| EP | 1 054 092 A1 | 11/2000 |
| EP | 1 066 957 A1 | 1/2001 |
| JP | 6-184897 | 7/1994 |
| WO | WO 95/19258 | 7/1995 |

OTHER PUBLICATIONS

Copy of European Search Report dated Jul. 30, 2001.

* cited by examiner

*Primary Examiner*—Jeff H. Aftergut
(74) *Attorney, Agent, or Firm*—Butzel Long

(57) ABSTRACT

A process for making an elastically stretchable composite sheet that includes an elastically stretchable web and inelastically stretchable web that are bonded together at a plurality of bonding spots. This stock web is stretched in a Y-direction and succeedingly contracted to obtain a composite sheet. The bonding spots are arranged so that each pair of the bonding spots lying adjacent to each other in a Y-direction at least partially overlap each other as one of these adjacent bonding spots is translated in the Y-direction.

1 Claim, 3 Drawing Sheets

PROCESS FOR MAKING ELASTICALLY STRETCHABLE COMPOSITE SHEET

BACKGROUND OF THE INVENTION

This invention relates to a process for making an elastically stretchable composite sheet having a comfortable touch.

Japanese Patent Application Publication No. 1994-184897A describes composite a stretchable material comprising a stretchable sheet and a necked material bonded to the stretchable sheet at three or more non-linearly arranged spots wherein the necked material is gathered between at least two of the three spots. Such a composite stretchable material can be obtained by bonding the necked material to the stretchable sheet under a stretched condition and then contracting the stretchable sheet from the stretched condition. According to this technique of prior art, the necked material changes a rubber-like surface popular in a stretchable sheet to a comfortable cloth-like surface without damaging a desired stretchability of the stretchable sheet.

According to this technique of prior art, the material previously necked by stretching it in one direction is bonded to the stretchable sheet. Consequently, the gathers are apt to distribute unevenly in a transverse direction orthogonal to the one direction at the stage that stretchable sheet is contracted from the stretched condition and thereupon the necked material is gathered. This is for the reason that, when the necked material is fibrous, the fibers lying along the side edges extending in the one direction are stretched at a ratio higher than the fibers lying intermediate regions between the side edges.

SUMMARY OF THE INVENTION

It is an object of this invention to provide a process for making an elastically stretchable composite sheet by stretching a stretchable composite web comprising an elastically stretchable web and an inelastically stretchable web so that the inelastically stretchable web may form gathers evenly distributed in the stretching direction as well as in the direction orthogonal thereto.

The object set forth above is achieved, according to this invention, by a process for making an elastically stretchable composite sheet, which can be more easily stretched than a composite web comprising an elastically stretchable web having upper and lower surfaces and an inelastically stretchable web of continuous fibers bonded to at least the upper surface of said surfaces of the elastically stretchable web, through steps of stretching the composite web in one direction and then contracting the composite web under an elastic contractible force provided by the elastically stretchable web. And the process utilizes spots to bond the elastically and inelastically stretchable webs to each other are formed in the composite web intermittently at least in the one direction of the one direction and a direction orthogonal thereto and the composite web is succeedingly stretched and then contracted in the one direction wherein a first spot of the spots and a second spot lying in the vicinity of the first spot in the one direction at least partially overlap each other as one of these first and second spots is translated in the one direction.

DETAILED DESCRIPTION OF THE PREFERRED EMBODIMENTS

A process for making an elastically stretchable composite sheet according to this invention will be described more in detail with reference to the accompanying drawings.

Figure 1:
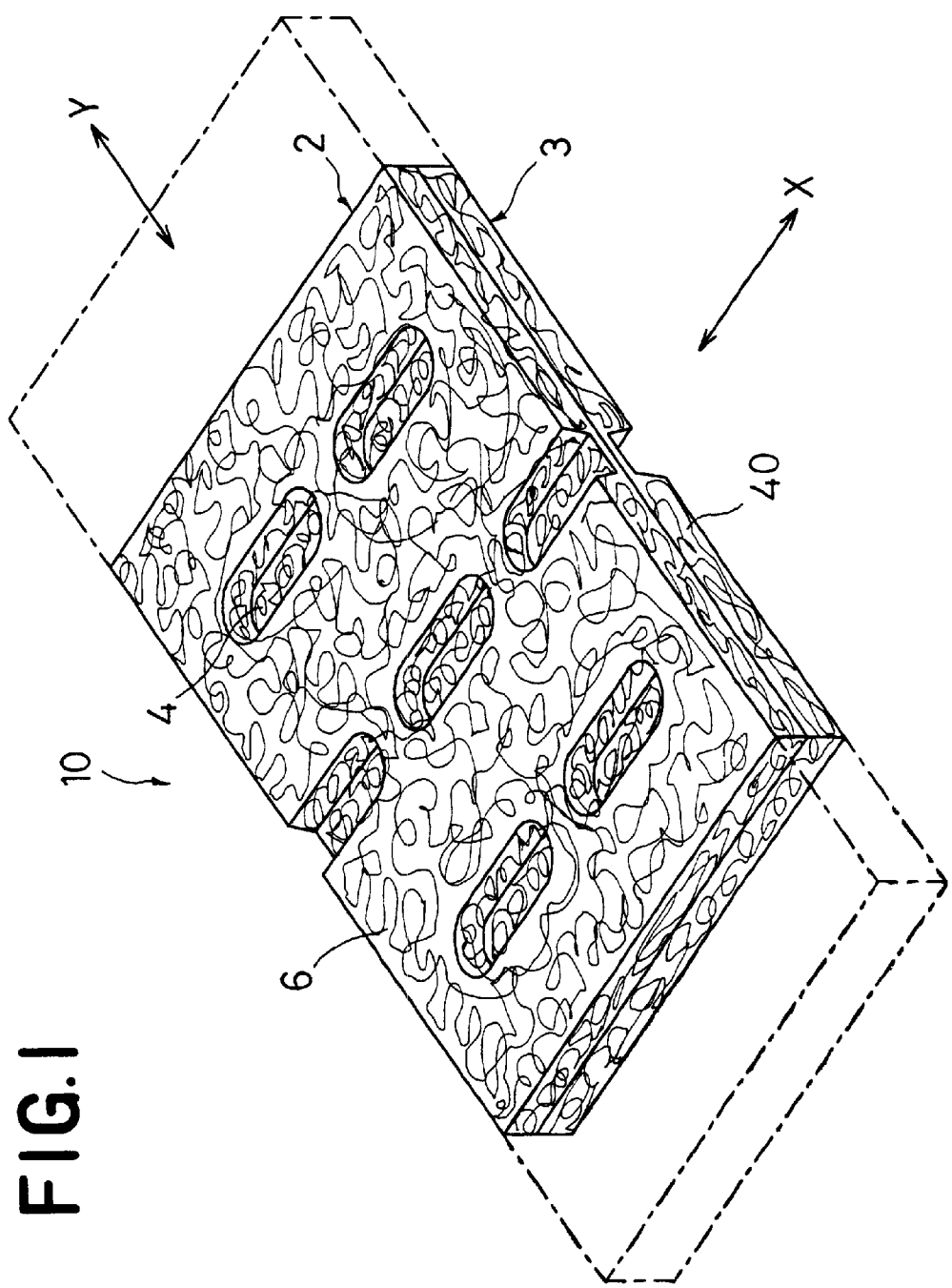
FIG. 1 is a perspective view of a composite web (stock web) used in a process according to this invention.
Figure 2:
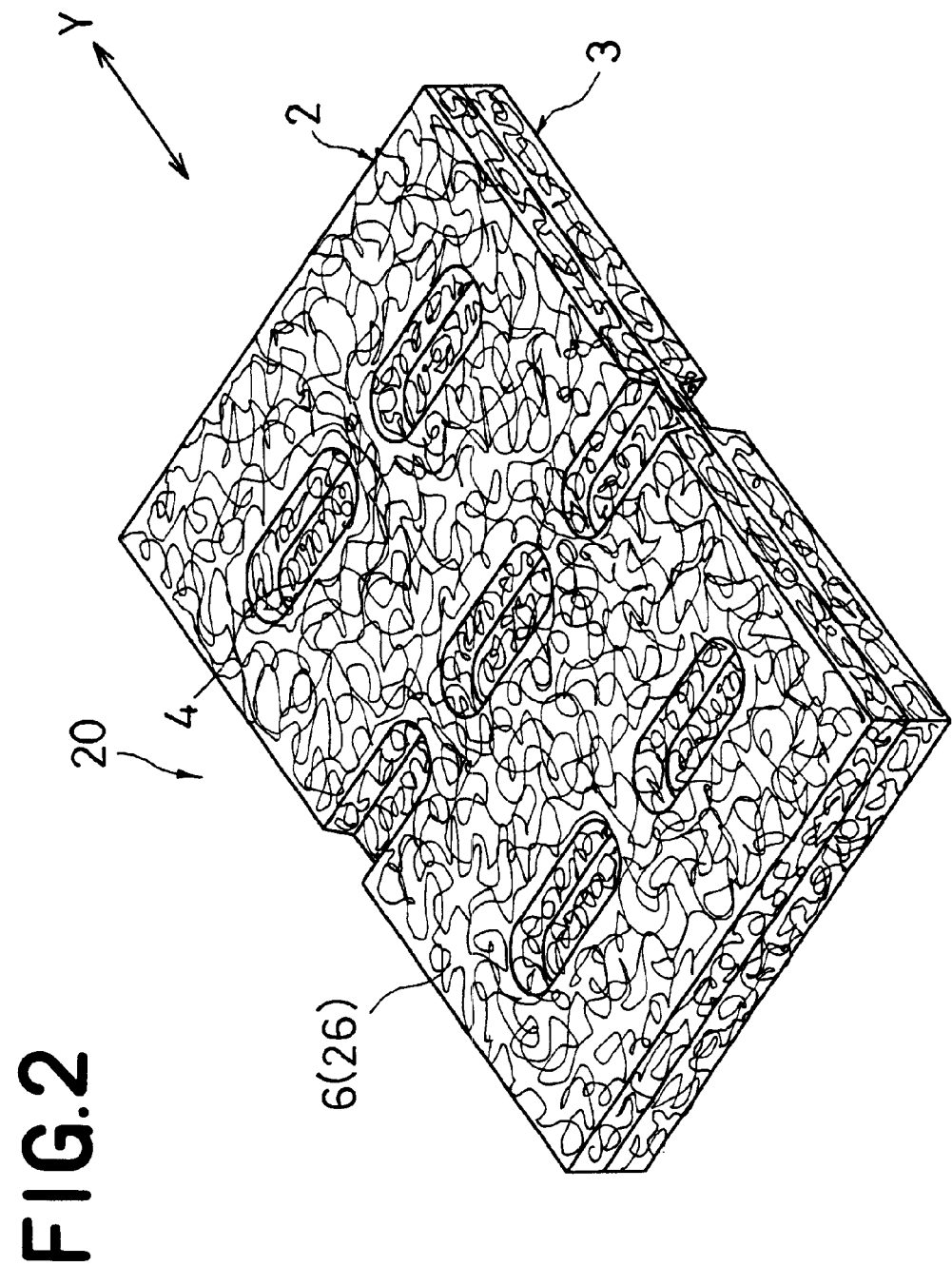
FIG. 2 is a perspective view of a composite sheet obtained from the composite web by the process according to this invention.

FIG. 1 is a fragmentary perspective view of a stock web 10 used in the process according to this invention and FIG. 2 is a fragmentary perspective view of a composite sheet 20 obtained from this web 10.

The stock web 10 comprises an inelastically stretchable web 2 formed with inelastically stretchable continuous fibers 6 oriented at random and an elastic web 3 formed with elastically stretchable continuous fibers 40 oriented at random, both webs 2, 3 being placed upon and bonded to each other at bonding spots 4. The stock web 10 formed in this manner is elastically stretchable in an X-direction and a Y-direction orthogonal thereto, at least in the Y-direction as indicated by imaginary lines. In the composite sheet 20, the continuous fibers 6 shown in FIG. 1 are in an elongated state between each pair of the adjacent bonding spots 4, 4. The fibers 6 in such a state are designated by reference numeral 26.

The composite sheet 20 can be obtained in such a manner that the stock web 10 is stretched in Y-direction within breaking limits of the stretchable web 2 and the elastic web 3 and also within an elastic limit of the elastic web 3 so that the continuous fibers 6 of the stretchable web 2 may be plastically deformed and thereby may become more fine. Then this stock web 10 is contracted under an elastic contractible force provided by the elastic web 3 to obtain the composite sheet 20. When the stock web 10 is stretched, the web 10 will need a force to stretch both the stretchable web 2 and the elastic web 3. However, when the composite sheet 20 is stretched, the sheet 20 will need only a force to stretch the elastic web 3, because the stretched fibers 26 of the stretchable web 2 are merely reoriented so as to extend in the Y-direction. In this manner, the composite sheet 20 is elastically stretchable more easily than the stock web 10.

Figure 3:
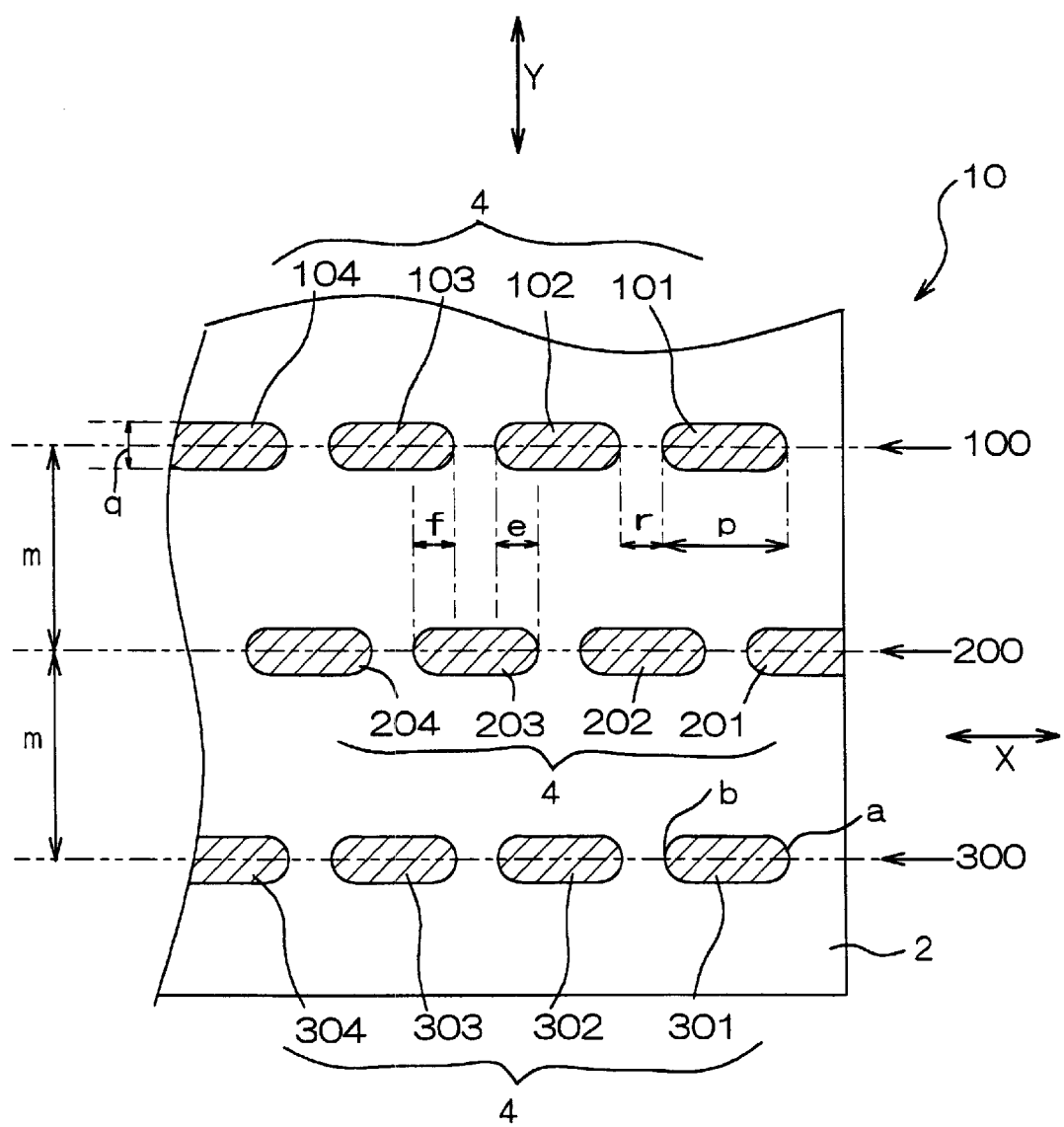
FIG. 3 is a plan view depicting the stock web.

FIG. 3 is a plan view of the stock web 10 as viewed directly above the stretchable sheet 2, in which the component fibers 6 are not shown. Referring to FIG. 3, reference numerals 101, 102, 103, 104 . . . designate individual bonding spots belonging to a first array 100 of the bonding spots 4, reference numerals 201, 202, 203, 204 . . . designate individual bonding spots belonging to a second array 200 of the bonding spots 4 and reference numerals 301, 302, 303, 304 . . . designate a third arrays 300 of the bonding spots 4, each array being arranged in the X-direction. In the illustrated embodiment, each of the bonding spots 4 has an oval shape defined by a major axis of a length p in the X-direction, a minor axis of a length q in the Y-direction, a first end a lying at right hand and a second end b lying in left hand as viewed in FIG. 3. Each pair of the bonding spots 4, 4 being adjacent in the X-direction, for example, the bonding spots 101, 102, or 102, 103 are spaced apart from each other by a distance r which is small than the length p of the major axis. When the bonding spot 102 is described to be adjacent to the bonding spot 101, it should be understood that the bonding spot 102 lies sufficiently near the bonding spot 101 and will at least partially overlap the bonding spot 101 if the bonding spot 102 is translated in the X-direction.

The respective arrays 100, 200, 300 . . . of the bonding spots 4 are spaced one from another by a distance m in the Y-direction. The respective bonding spots 201, 202, 203, 204 . . . of the second array 200 are arranged relatively to the respective bonding spots 101, 102, 103, 104 . . . of the first array 100 as follows: the bonding spot 202 lies between the bonding spots 101 and 102, the bonding spot 203 lies between the bonding spots 102 and 103, and the bonding spot 204 lies between the bonding spots 103 and 104. If the second array 200 is translated in the Y-direction, the bonding spot 202 will partially overlap the bonding spots 101 and 102. Similarly, the bonding spot 203 will partially overlap the bonding spots 102 and 103. Dimensions in the X-direction by which the bonding spot 202 will overlap the bonding spot 101, on one hand, and overlap the bonding spot 102, on the other hand, are indicated by e and f, respectively. Relationship established between the bonding spots 201, 202, 203, 204 . . . of the second array 200 and the bonding spots 301, 302, 303, 304 . . . of the third array is similar to the relationship established between the first array 100 and the second array 200. A group of the bonding spots 4 which are adjacent one to another in Y-direction include, for example, the bonding spot 202 and those which will partially overlap the bonding spot 202 when translated in the Y-direction, i.e., the bonding spots 101, 102, 301 and 302.

The respective bonding spots 101, 102 . . . , 201, 202 . . . 301, 302 . . . are arranged so that they may at least partially overlap one another as they are translated in the Y-direction, more preferably, the spots adjacent one to another in Y-direction as seen in FIG. 3 are arranged so that they may at least partially overlap one another as they are translated in the Y-direction. With such arrangements, plastic deformations of the continuous fibers 6 occur between each pair of the bonding spots 4, 4 being adjacent in the Y-direction in the case that the stock web 10 comprising the continuous fibers 6 distributed at random is stretched in the Y-direction. Such plastic deformations easily elongate the continuous fibers 6 to more fine fibers. In the composite sheet 20 obtained by contracting the stock web 10 from the stretched condition under the elastic contractible force provided by the elastic web 3, higher the ratio at which the continuous fibers 6 have been stretched, i.e., longer the stretched continuous fibers 26 (See FIG. 2) are between each pair of the adjacent bonding spots 4, 4, much more the gathers are formed. As a result, the surface of the composite sheet 20 will have a soft touch.

In order that the bonding spots 4 can advantageously function for the continuous fibers 6, preferably, the dimension p is at least 0.3 mm, the dimension q is 0.2~6 mm, the dimensions e and f are at least 0.3 mm and the distance by which the bonding spots are spaced one from another in the Y-direction is 0.5~30 mm. The bonding spots 4 preferably occupy 5~20% of the entire area of the stock web 10.

While a plurality of bonding spots 4, i.e., the bonding spots 101, 102 . . . , 201, 202 . . . , 301, 302 . . . are illustrated to be identical in their shapes, it is possible without departing from the scope of this invention to alter their shapes and layout. For example, the respective arrays including the first array 100 may continuously extend across the full width of the stock web 10. In the illustrated embodiment, the bonding spots 4 are formed intermittently in the X-direction so that the composite sheet 20 may be stretchable in the X-direction as well as in the Y-direction. Stretchability of the composite sheet 20 in the X-direction will be reduced if the bonding spots 4 continuously extend in the X-direction.

To implement this invention, the continuous fibers 6 may be selected from a group of fibers including homopolymer, copolymer and terpolymer of propylene. The elastic web 3 formed with elastic fibers 40 may be replaced by a film made of a plastic elastomer.

The process according to this invention for making the elastically stretchable composite sheet facilitates the continuous fibers of the stretchable web as one component of the stock web to be evenly stretched in the stretching direction of the stock web as well as in the direction orthogonal thereto as the stock web is stretched. This is brought by the construction of the stock web that the bonding spots of the stock web are formed intermittently in the stretching direction of the stock web and uniquely distributed so that the bonding spots will at least partially overlap one another if these bonding spots are translated in the stretching direction. In the composite sheet obtained in this manner, the continuous fibers form the gathers evenly not only in the stretching direction but also in the direction orthogonal thereto.

What is claimed is:

1. A process for making an elastically stretchable composite sheet which comprises:

providing an elastically stretchable web having upper and lower surfaces;

providing an inelastically stretchable web formed with inelastically stretchable continuous fibers;

intermittently bonding said inelastically stretchable web to at least the upper surface of said elastically stretchable web at a plurality of discrete bonding spots to form a composite web, said discrete bonding spots comprising depressions that are formed in the composite sheet that do not extend through the composite sheet, each of said discrete bonding spots having an oblong shape with a major axis and a minor axis, each of the major axes of all of the bonding spots being aligned in a first direction, said discrete bonding spots being provided in rows that extend in the first direction and are aligned with respect to one another in both the first direction and a second direction orthogonal to the first direction so that bonding spots in each of said rows of bonding spots would at least partially overlap bonding spots in an adjacent row of bonding spots without providing gaps between the overlapping bonding spots, if adjacent rows of bonding spots were translated over one another in the second direction;

stretching said composite web in the first direction; and allowing the stretched composite web to contract in the first direction under an elastic contractile force provided by the elastically stretchable web so as to produce gathers in the composite web which gathers are evenly distributed in both the first direction and in the second direction.

\* \* \* \* \*